US010161482B1

(12) United States Patent
Theisen et al.

(10) Patent No.: US 10,161,482 B1
(45) Date of Patent: Dec. 25, 2018

(54) PLANETARY TRANSMISSION ARRANGEMENTS FOR MARINE PROPULSION DEVICES

(71) Applicant: Brunswick Corporation, Lake Forest, IL (US)

(72) Inventors: Thomas G. Theisen, Fond du Lac, WI (US); Gary J. Schaub, North Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 153 days.

(21) Appl. No.: 15/372,847

(22) Filed: Dec. 8, 2016

(51) Int. Cl.
| F16H 3/60 | (2006.01) |
| F16H 61/30 | (2006.01) |
| B63H 23/02 | (2006.01) |
| B63H 23/08 | (2006.01) |
| B63H 23/30 | (2006.01) |
| F16H 3/44 | (2006.01) |

(52) U.S. Cl.
CPC .............. *F16H 3/60* (2013.01); *B63H 23/02* (2013.01); *B63H 23/08* (2013.01); *B63H 23/30* (2013.01); *F16H 61/30* (2013.01); *B63H 2023/305* (2013.01); *F16H 2003/445* (2013.01); *F16H 2003/447* (2013.01)

(58) Field of Classification Search
CPC ........ F16H 1/28; F16H 2001/327; F16H 9/26; F16H 15/48; F16H 57/082; F16H 2057/087; F16H 3/62; F16H 63/3026; F16H 2063/025; F16H 2712/04; B63H 21/21; B63H 21/26; B63H 23/08; B63H 23/30

See application file for complete search history.

(56) References Cited

U.S. PATENT DOCUMENTS

| 5,509,863 | A | * | 4/1996 | Mansson ................ B63H 23/08 475/273 |
| 6,350,165 | B1 | | 2/2002 | Neisen |
| 6,435,923 | B1 | | 8/2002 | Ferguson |
| 7,891,263 | B2 | | 2/2011 | Mowbray et al. |
| 7,972,712 | B2 | | 5/2011 | Suzuki et al. |
| 8,109,800 | B2 | | 2/2012 | Okabe et al. |
| 8,157,694 | B2 | | 4/2012 | Nakamura et al. |
| 8,277,270 | B2 | | 10/2012 | Ryuman |
| 8,317,556 | B2 | | 11/2012 | Suzuki et al. |
| 9,841,067 | B1 | * | 12/2017 | Logan ................... F16D 25/123 |

* cited by examiner

*Primary Examiner* — Mark J Beauchaine

(74) *Attorney, Agent, or Firm* — Andrus Intellectual Property Law, LLP

(57) ABSTRACT

A transmission is for a marine drive. The transmission comprises an input shaft that is caused to rotate by the marine drive and an output shaft that is caused to rotate by the input shaft. The input shaft and output shaft are operatively connected to each other such that forward rotation of the input shaft causes forward rotation of the output shaft when the transmission is shifted into a forward gear, and such that forward rotation of the input shaft causes reverse rotation of the output shaft when the transmission is shifted into a reverse gear. A planetary gearset operatively couples the input shaft to the output shaft only when the transmission is shifted into the reverse gear.

17 Claims, 10 Drawing Sheets

PLANETARY TRANSMISSION ARRANGEMENTS FOR MARINE PROPULSION DEVICES

FIELD

The present disclosure relates to marine propulsion devices, and more particularly to transmission arrangements for marine propulsion devices.

BACKGROUND

The following U.S. patents are incorporated herein by reference:

U.S. Pat. No. 6,350,165 discloses an inboard/outboard powered watercraft that incorporates a transmission in its vertical drive unit for providing two forward speeds plus reverse. The transmission is packaged to fit within the vertical drive unit by incorporating a bevel gear apparatus. In one embodiment, the transmission also includes a planetary gear apparatus together with two hydraulic clutches and a ring gear brake. In a second embodiment, three hydraulic clutches are utilized with bevel gears alone to provide the two forward and reverse speeds.

U.S. Pat. No. 6,435,923 discloses a two-speed transmission with reverse gearing for a watercraft. The transmission is disposed in the gimbal housing passing through the transom of the watercraft. A pair of planetary gears share a common ring gear to provide both forward-reverse and first-second gearing in a very compact package. The transmission housing may be formed in two portions, a first housing containing the forward-reverse gear mechanisms and a second housing containing the first-second gear mechanism. The transmission output shaft is connected to the drive shaft of a vertical drive unit by a double universal joint that may be replaced without disassembling the transmission components.

U.S. Pat. No. 7,891,263 discloses a two speed transmission system mounted for driving a marine craft comprising: an input shaft coupled in direct connection with a driveshaft of an engine of the marine craft; an output shaft coaxial with the input shaft coupled in direct connection with a driveline of the marine craft; a first gear train for transmitting drive at a fixed first gear ratio; a second gear train for transmitting drive at a fixed second gear ratio; a first friction clutch operable to engage/disengage the first gear train; and a second friction clutch operable to engage/disengage the second gear train, wherein in shifting between the first gear ratio and the second gear ratio one of the friction clutches is disengaged using controlled slippage while the other friction clutch is engaged using controlled slippage.

U.S. Pat. No. 7,942,712 discloses an outboard motor that includes a power source, a boat propulsion section, a shift position switching mechanism, a clutch actuator, and a control device. The shift position switching mechanism switches among a first shift position in which a first clutch is engaged and a second clutch is disengaged, a second shift position in which the first clutch is disengaged and the second clutch is engaged, and a neutral position in which both the first clutch and the second clutch are disengaged. When a gear shift is to be made from the first shift position to the second shift position, the control section causes the clutch actuator to gradually increase an engagement force of the second clutch. The outboard motor reduces the load to be applied to the power source and the power transmission mechanism at the time of a gear shift in a boat propulsion system including an electronically controlled shift mechanism.

U.S. Pat. No. 8,109,800 discloses a transmission device that includes hydraulic type transmission mechanisms arranged to change the speed or the direction of rotation of an engine, and hydraulic pressure control valves arranged to control hydraulic pressure supplied to the hydraulic type transmission mechanisms. The hydraulic pressure control valves are disposed on one side or the other side in the watercraft width direction. The transmission device provides an outboard motor capable of securing cooling characteristics of a hydraulic pressure control valve without incurring complexity in structure and increase in cost.

U.S. Pat. No. 8,157,694 discloses an outboard motor having a power transmission mechanism for transmitting power of an engine to a propeller. The power transmission mechanism has a transmission ratio changing unit having a planetary gear train including a sun gear, planetary gears, and an internal gear. The internal gear is connected to an input side shaft on the engine side. The planetary gears are connected to an output side shaft on the propeller side. The sun gear is connected to a stationary portion via a one-way clutch. The planetary gears and the internal gear and/or the sun gear are connected by an on-off clutch. When the on-off clutch is disengaged, the one-way clutch is engaged and the speed from the input side shaft is outputted from the output side shaft with a reduced speed. When the on-off clutch is engaged, the speed from the input side shaft is outputted from the output side shaft with the same speed.

U.S. Pat. No. 8,277,270 discloses a boat propulsion unit that includes a power source, a propeller, a shift position switching mechanism, a control device, and a retention switch. The propeller is driven by the power source to generate propulsive force. The shift position switching mechanism has an input shaft connected to a side of the power source, an output shaft connected to a side of the propeller, and clutches that change a connection state between the input shaft and the output shaft. A shift position of the shift position switching mechanism is switched among forward, neutral, and reverse by engaging and disengaging the clutches. The control device adjusts an engagement force of the clutches. The retention switch is connected to the control device. When the retention switch is turned on by an operator, the control device controls the engagement force of the clutches to retain a hull in a predefined position. The boat propulsion unit provides a boat propulsion unit that can accurately retain a boat at a fixed point.

U.S. Pat. No. 8,317,556 discloses a boat propulsion system that includes a power source, a propulsion section, a shift position switching mechanism arranged to switch among a first shift position, a second shift position, and a neutral position, a gear ratio switching mechanism, an actuator, and a control section. When switching is to be performed from the neutral position to the first shift position and the high-speed gear ratio, the control section is arranged to cause the actuator to, maintain the low-speed gear ratio, switch to the first shift position, and then establish the high-speed gear ratio when the current gear ratio of the gear ratio switching mechanism is the low-speed gear ratio, and cause the actuator to establish the low-speed gear ratio before switching to the first shift position, switch to the first shift position, and then establish the high-speed gear ratio when the current gear ratio of the gear ratio switching mechanism is the high-speed gear ratio. This arrangement improves the durability of a power source and a power transmission mechanism in a boat propulsion system including an electronically controlled shift mechanism.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

A transmission is provided for a marine drive. The transmission comprises an input shaft that is caused to rotate by the marine drive and an output shaft that is caused to rotate by the input shaft. The input shaft and output shaft are operatively connected to each other such that forward rotation of the input shaft causes forward rotation of the output shaft when the transmission is shifted into a forward gear, and such that forward rotation of the input shaft causes reverse rotation of the output shaft when the transmission is shifted into a reverse gear. A planetary gearset operatively couples the input shaft to the output shaft only when the transmission is shifted into the reverse gear.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

In the above description, certain terms have been used for brevity, clarity, and understanding. No unnecessary limitations are to be inferred therefrom beyond the requirement of the prior art because such terms are used for descriptive purposes and are intended to be broadly construed. The different apparatuses and methods described herein may be used alone or in combination with other apparatuses and methods. It is to be expected that various equivalents, alternatives and modifications are possible within the scope of the appended claims.

During research and development, the present inventors have found that transmission length is an important factor in marine transmissions, including marine transmissions for stern drive, outboard, inboard and inboard/outboard marine propulsion devices. The shorter the transmission, the easier it can be packaged into a wide variety of boat hulls. The present inventors have also found that transmission torque capacity is an important factor in marine transmissions. Thus, the inventors have found it to be desirable to provide a transmission for a marine drive with both a short package size and a high torque capacity.

During research and development, the present inventors have also found that prior art transmissions having planetary arrangements transmit torque load in forward gear through a forward clutch pack, then through planet gears, and then out through a carrier/outputs shaft. The torque load is multiplied when it is transmitted through the planet gears by the solar ratio of the planetary arrangement. Thus, the planetary gears and clutch packs must be designed to carry the "multiplied torque" as opposed to simply carrying the engine torque. This adds size to the transmission. The present disclosure is a result of the present inventors efforts to overcome these deficiencies in the prior art.

Figure 1:
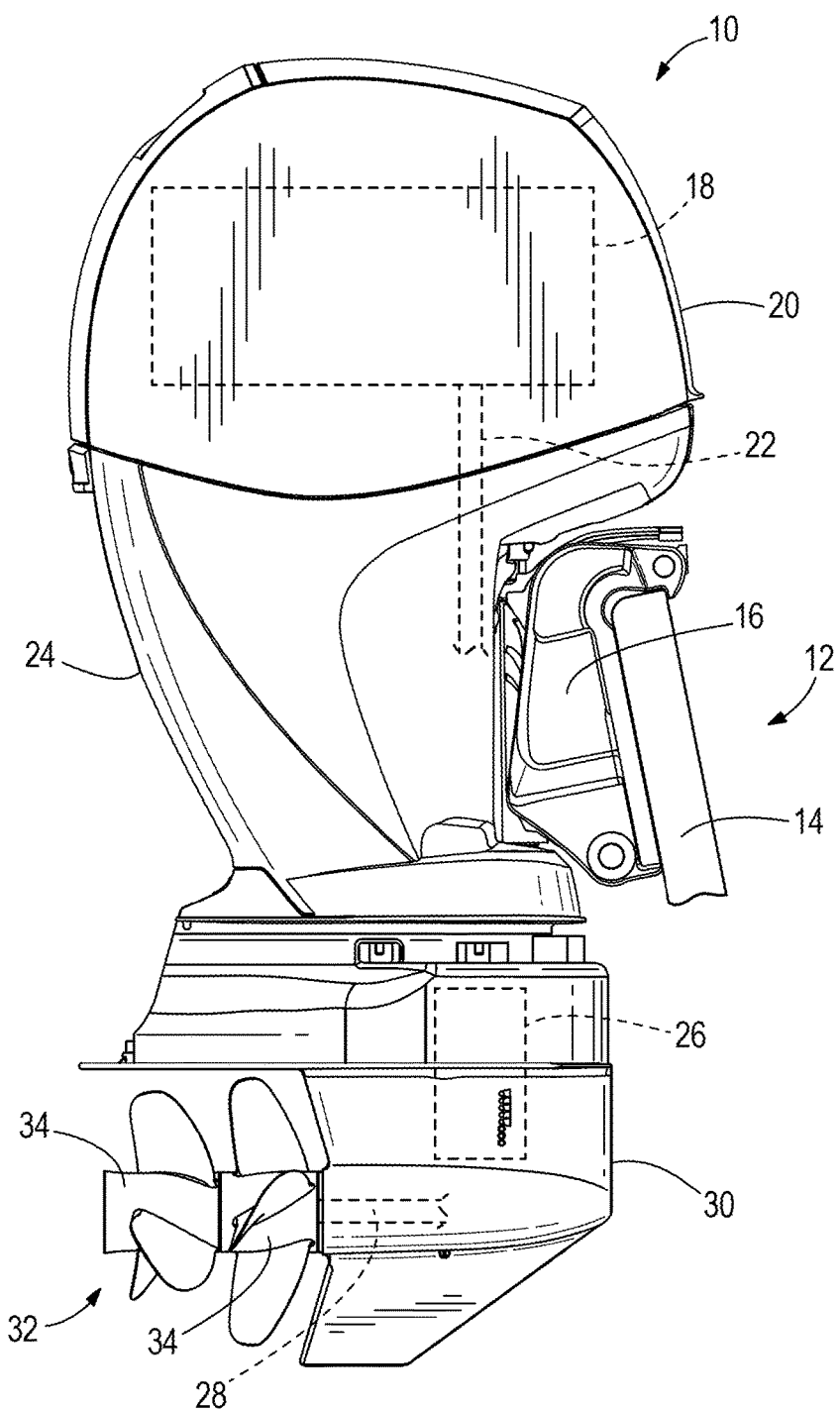
FIG. 1 is a side view of an exemplary outboard marine propulsion device.
Figure 10:
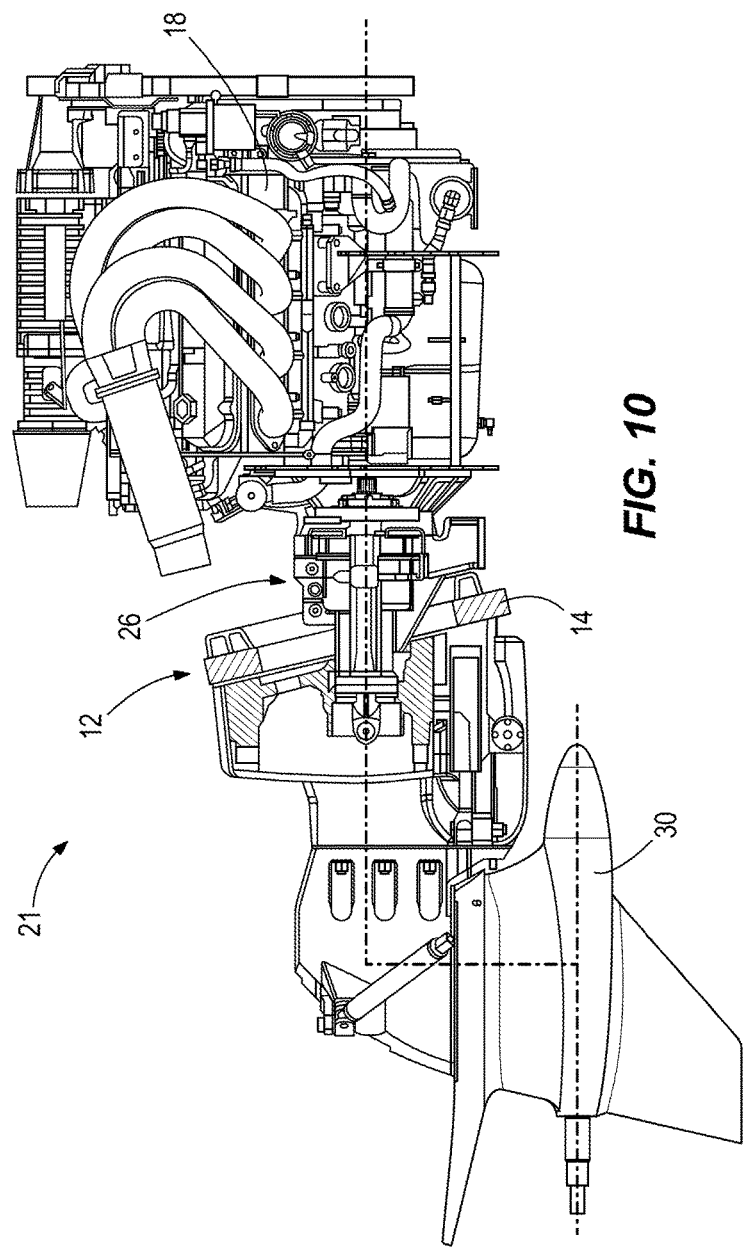
FIG. 10 is a side view of an exemplary stern drive, incorporating the transmission

FIG. 1 depicts an exemplary outboard marine propulsion device 10 for propelling a marine vessel 12 in water. The outboard marine propulsion device 10 is connected to a transom 14 of the marine vessel 12 by a conventional transom bracket 16. The outboard marine propulsion device 10 includes a marine drive, which in this example is an internal combustion engine 18 located within an upper cowling 20. The type of marine drive can vary and for example can also or alternately include an electric motor. The engine 18 causes forward rotation of a driveshaft 22, which downwardly extends from the engine 18 through a driveshaft housing 24. A transmission 26 is configured to transfer rotational power from the vertically extending driveshaft 22 to a horizontally extending propulsor shaft 28 located in a lower gearcase 30. The transmission 26 is generally vertically oriented and is located in or above the lower gearcase 30, which is disposed beneath the driveshaft housing 24. Rotation of the propulsor shaft 28 causes rotation of a propulsor 32, which in this example includes counter-rotating propellers 34. The type of propulsor 32 can vary from that which is shown, and in other examples can include single or multiple propellers, single or multiple impellers, and/or the like. It should however be recognized that the concepts of the present disclosure are not limited for use with outboard marine propulsion devices. For example, FIG. 10 depicts a transmission 26 according to the present disclosure in a stern drive 21, wherein the transmission 26 is generally horizontally oriented.

An exemplary embodiment of the transmission 26 is shown in FIGS. 2-6. The transmission 26 includes an input shaft 36 that is caused to rotate by the engine 18. The input shaft 36 can be the driveshaft 22 or an extension of the driveshaft 22 such that rotation of the driveshaft 22 causes concurrent rotation of the input shaft 36. The transmission 26 also includes an output shaft 38 that is coupled to the propulsor shaft 28 via, for example, an optional shaft extension 31, and/or an optional connector 33, and/or a conventional angle gearset (not shown) such that rotation of the vertically-extending output shaft 38 causes concurrent rotation of the horizontally-extending propulsor shaft 28.

As described further herein below, the input shaft 36 and output shaft 38 are operatively connected to each other by the transmission 26 such that forward rotation of the input shaft 36 causes forward rotation of the output shaft 38 when the transmission 26 is shifted into a forward gear, and such that forward rotation of the input shaft 36 causes reverse rotation of the output shaft 38 when the transmission 26 is shifted into a reverse gear. The transmission 26 is also configured to be shifted into neutral, wherein the input shaft 36 and output shaft 38 are operatively disconnected. As shown in the figures, the input shaft 36 and output shaft 38 are coaxial aligned.

Figure 2:
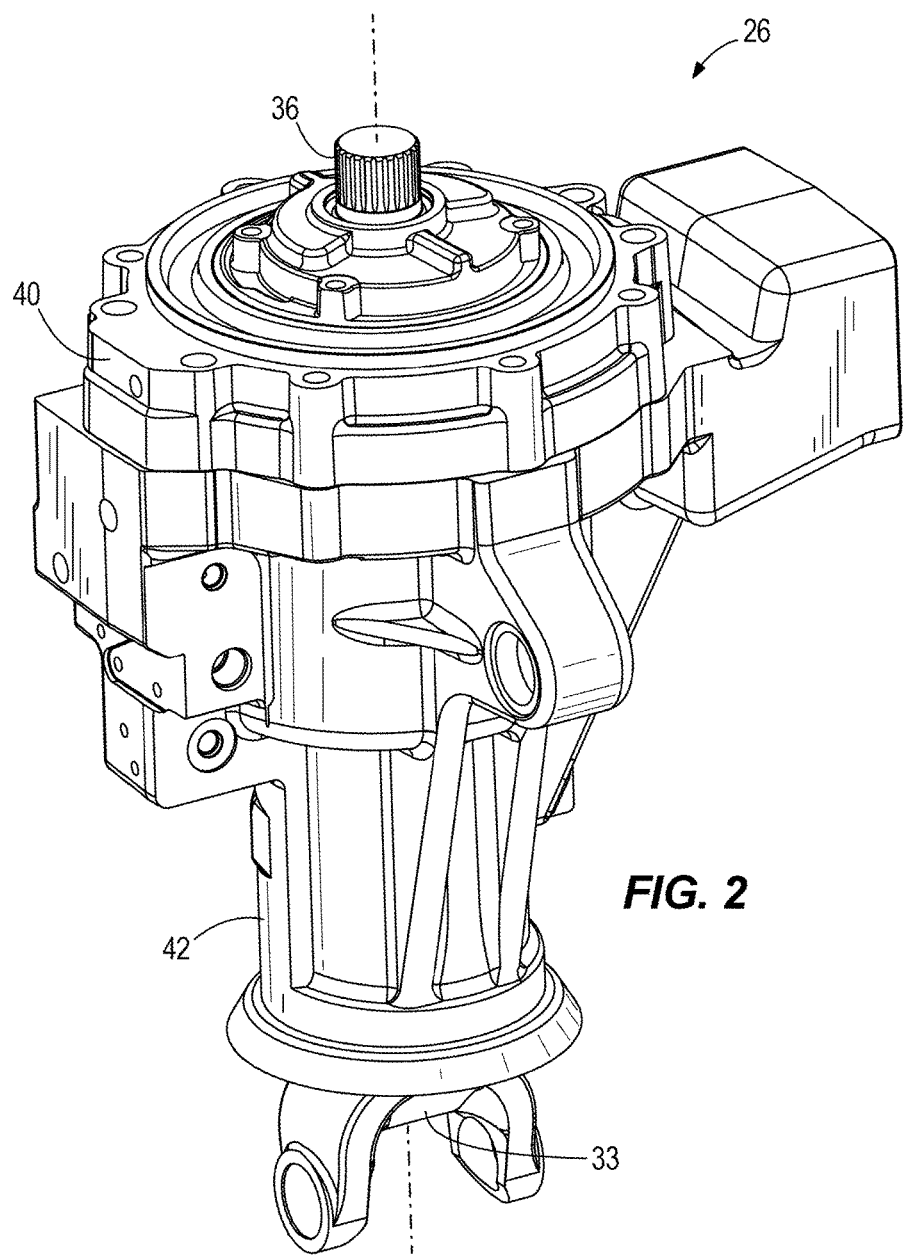
FIG. 2 is a perspective view of a transmission for the outboard marine propulsion device.

Referring to FIG. 2, the transmission 26 includes an upper housing 40 and a lower housing 42. The upper and lower housings 40, 42 are connected together to enclose various components of the transmission assembly. The input shaft 36 extends through a hole in the top of the upper housing 40 and the output shaft 38 (either directly or via for example the optional shaft extension 31 and/or optional connector 33) extends out of a hole in the bottom of the lower housing 42.

Figure 3:
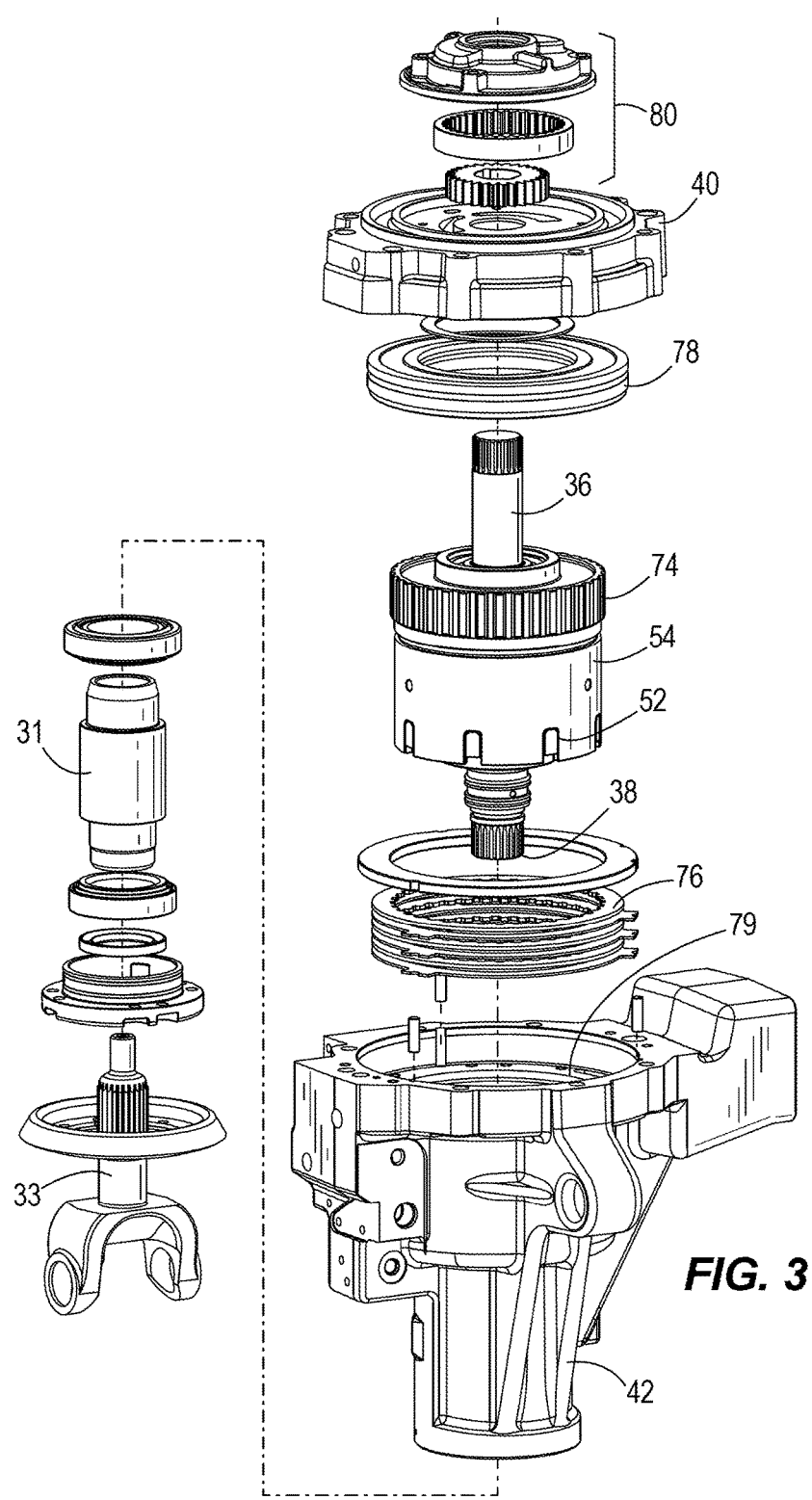
FIGS. 3-6 are exploded views of the transmission.
Figure 4:
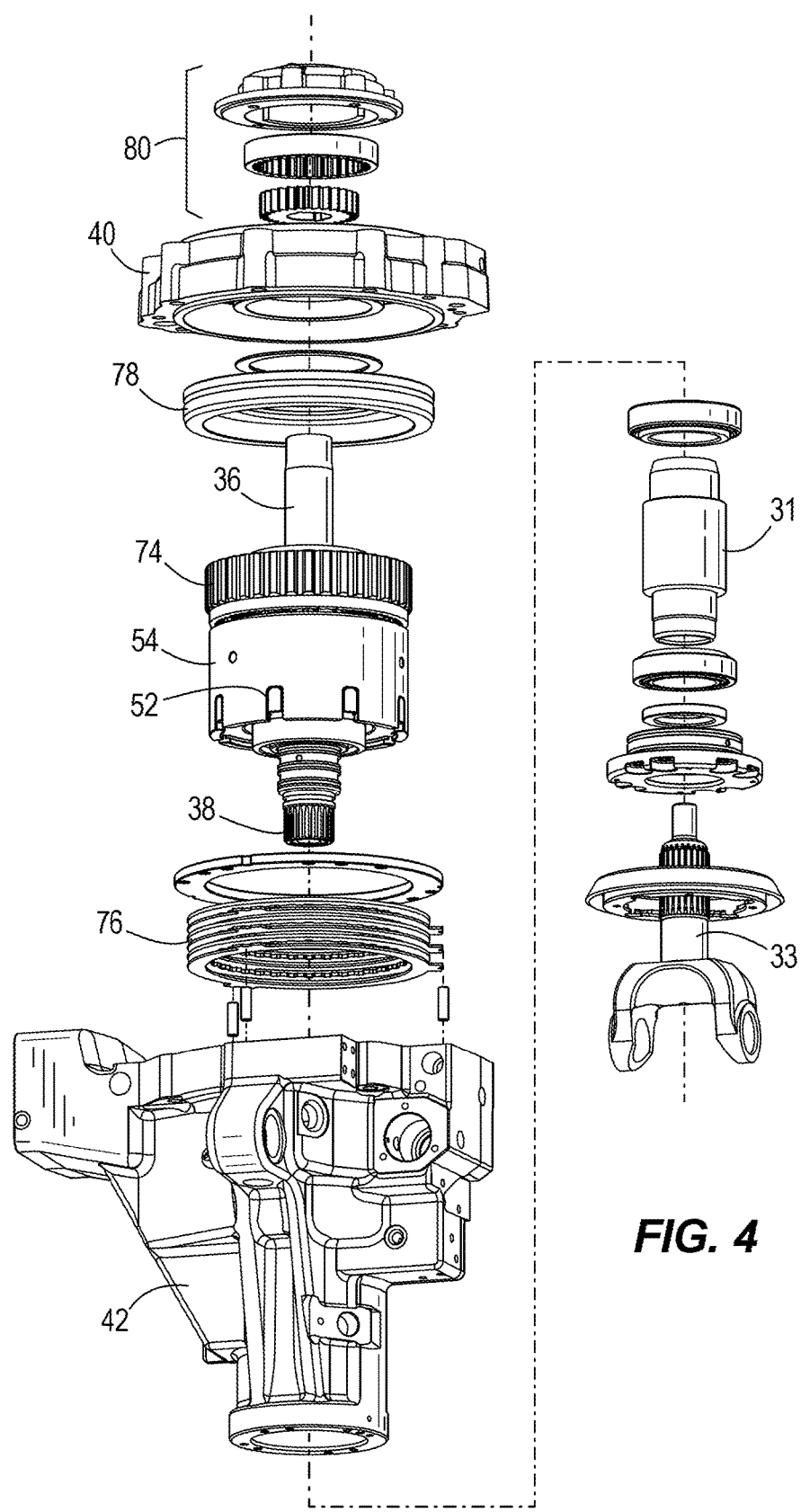
Figure 5:
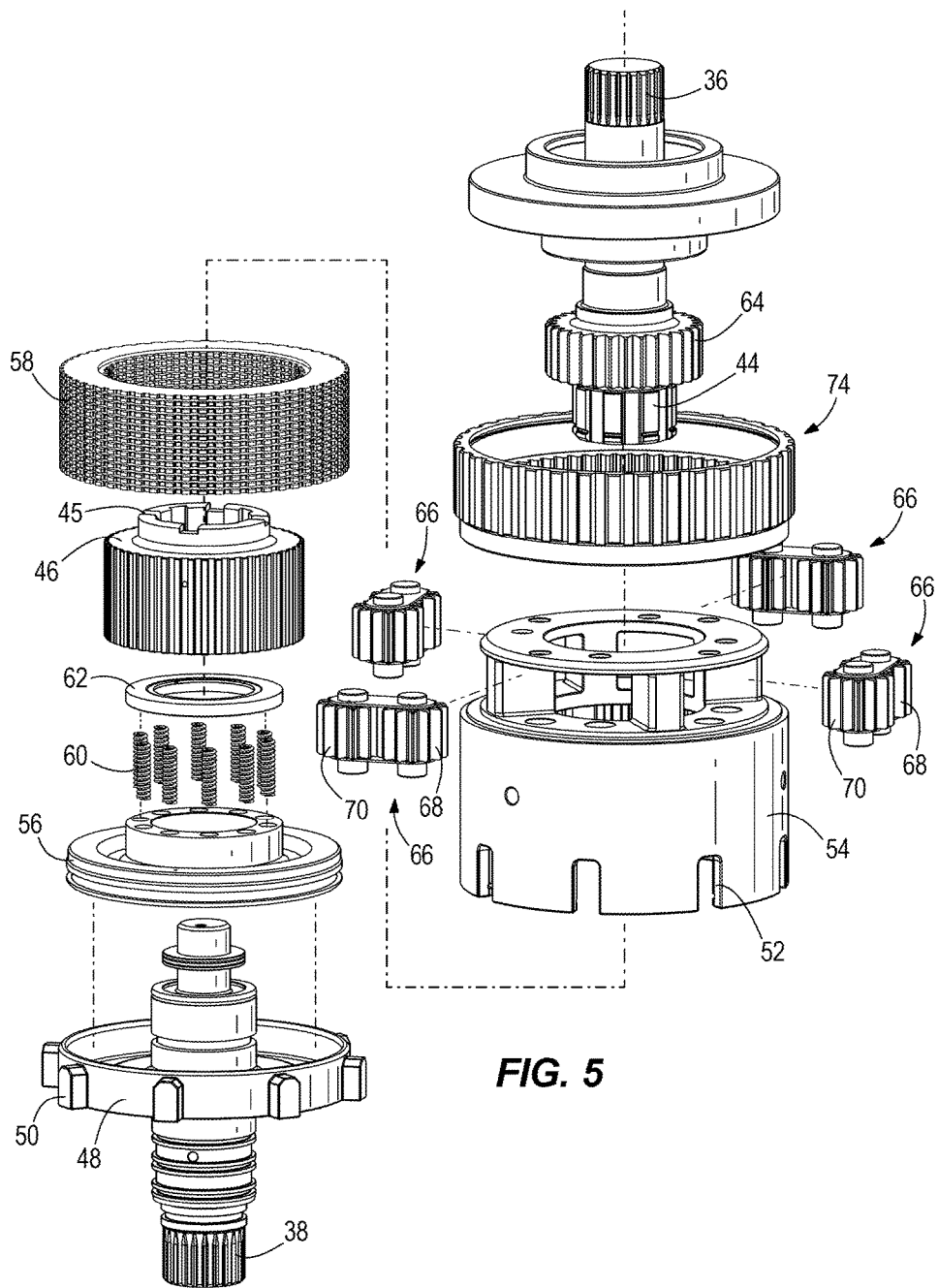
Figure 6:
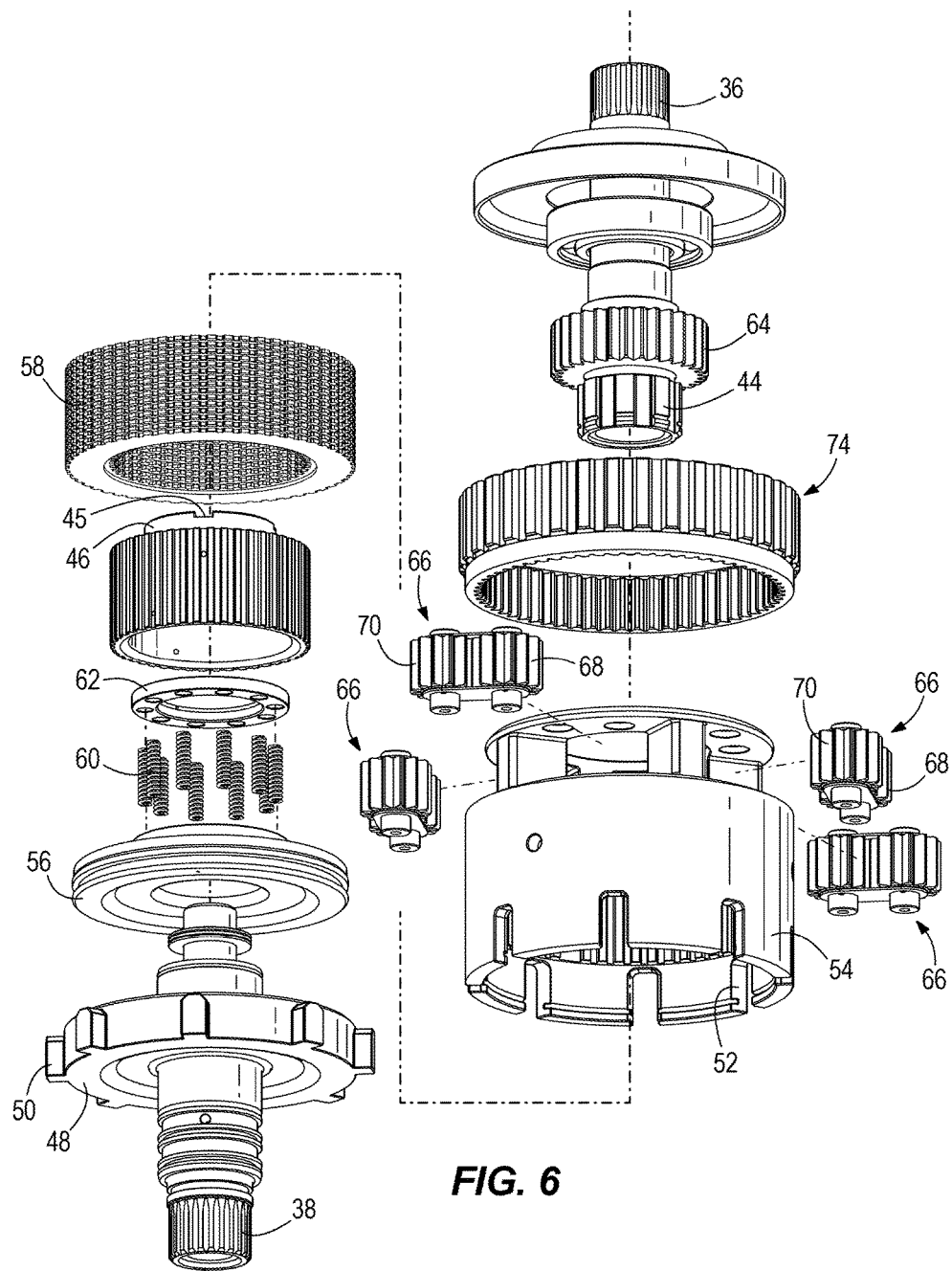

Referring to FIGS. 3-5, the input shaft 36 is connected to an inner clutch hub 46 such that forward rotation of the input shaft 36 causes forward rotation of the inner clutch hub 46. More specifically, a plurality of axially extending ridges 44 are radially spaced apart around the lower end of the input shaft 36 and are engaged with a plurality of axially extending and radially spaced apart recesses 45 on an inner diameter of the inner clutch hub 46 so that the input shaft 36 is connected to and rotates the inner clutch hub 46. A lower tray 48 is fixed to and rotates with an upper end of the output shaft 38. The outer periphery of the lower tray 48 has a plurality of ridges 50, which are radially spaced apart. The ridges 50 engage with corresponding open-ended slots 52 on the lower end of a carrier 54, such that the lower tray 48 and carrier 54 rotate together with the output shaft 38.

A forward clutch is disposed inside of the carrier 54. The forward clutch operates to connect the inner clutch hub 46 to the carrier 54 such that forward rotation of the input shaft 36 causes forward rotation of the output shaft 38. The configuration of the forward clutch can vary from that which is shown. In the illustrated example, the forward clutch includes a forward clutch piston 56 which is hydraulically actuated to frictionally engage a plurality of forward clutch plates 58 with an inner end surface of the carrier 54. The forward clutch plates 58 are splined to the outer perimeter of the inner clutch hub 46 and thus are configured to axially slide along the outer perimeter. Actuation of the forward clutch piston 56 axially slides the forward clutch plates 58 along the outer perimeter of the inner clutch hub 46 until the forward clutch plates 58 frictionally engage the carrier 54 and thereby rotationally lock the carrier 54 to the inner clutch hub 46. In the locked position, rotation of the input shaft 36 causes rotation of the inner clutch hub 46, which causes rotation of the carrier 54 via the forward clutch plates 58. As described above, rotation of the carrier 54 causes rotation of the lower tray 48 and output shaft 38. The forward clutch piston 56 is normally disengaged from the forward clutch plates 58 by a plurality of springs 60 that normally bias the forward clutch piston 56 away from the base ring 62 on the inner clutch hub 46. As described further herein below, pressurized hydraulic fluid can be selectively applied to the forward clutch piston 56 to move the piston against the bias of the springs 60 and into frictional engagement with the carrier 54.

Referring to FIG. 5, the transmission 26 includes the noted planetary gearset, which includes a sun gear 64 that is fixed to (or formed together with) the input shaft 36 such that forward rotation of the input shaft 36 causes forward rotation of the sun gear 64. The planetary gearset further includes a plurality of pairs of planet gears 66. Each pair of planet gears 66 has a first planet gear 68 that is meshed with the sun gear 64 such that forward rotation of the sun gear 64 causes reverse rotation of the first planet gear 68, and a second planet gear 70 that is meshed with the first planet gear 68 such that reverse rotation of the first planet gear 68 causes forward rotation of the second planet gear 70. Each second planet gear 70 is engaged with an internal splined surface 72 of a surrounding ring gear 74, such that forward rotation of the second planet gear 70 causes reverse rotation of the ring gear 74. The plurality of pairs of planet gears 66 are supported by a supporting bracket on the upper end of the carrier 54 such that each planet gear 68, 70 can freely rotate about its own axis. The carrier 54 is further rotatable about the axis defined by the input and output shafts 36, 38.

The transmission 26 includes a reverse clutch that is configured to operatively couple the input shaft 36 to the output shaft 38 so that forward rotation of the input shaft 36 causes reverse rotation of the output shaft 38. The configuration of the reverse clutch can vary from that which is shown. In the example shown, the reverse clutch includes a plurality of reverse clutch plates 76 that are splined to an outer perimeter of the ring gear 74 such that the plurality of reverse clutch plates 76 are axially slideable along the outer perimeter. The reverse clutch further includes reverse clutch piston 78 that is hydraulically actuated to frictionally engage the reverse clutch plates 76 with an internal surface 79 of the lower housing 42, to thereby to prevent rotation of the ring gear 74. More specifically, application of hydraulic fluid on the reverse clutch piston 78 forces the piston to axially slide downwardly along the outer perimeter of the ring gear 74 into engagement with the internal surface 79 of the lower housing 42, which is stationary, thus locking the rotational position of the ring gear 74 in place. When rotation of the ring gear 74 is prevented, forward rotation of the input shaft 36 and sun gear 64 causes the plurality of pairs of planet gears 66 to reversely orbit the sun gear 64. The reverse orbiting of the plurality of pairs of planet gears 66 about the sun gear 64 causes corresponding reverse rotation of the carrier 54, which in turn causes corresponding reverse rotation of the output shaft 38 via its connection to the carrier 54 at the lower tray 48.

Thus, the noted planetary gearset operatively couples the input shaft 36 to the output shaft 38 only when the transmission 26 is shifted into the reverse gear. That is, in forward gear, forward rotation of the input shaft 36 causes forward rotation of the output shaft 38, as described herein above, without assistance from the noted planetary gearset when the transmission 26. That is, when the transmission 26 is shifted into the forward gear, rotational power from forward rotation of the input shaft 36 is transferred to the output shaft 38 without said rotational power (load) being applied to the noted planetary gearset.

As described above, the forward clutch piston 56 and reverse clutch piston 78 are actuated into their respective locked position by pressurized hydraulic fluid. The method of providing the pressurized hydraulic fluid to the respective pistons 56, 78 can vary. In the illustrated example, the a pump 80 is disposed on the input shaft 36 and is powered by forward rotation of the input shaft 36. The pump 80 is a conventional item that is capable of pumping hydraulic fluid to the pistons 56, 78 via a hydraulic circuit having various hydraulic fluid passageways 82 and check valves (not all are shown). A conventional pump controller can be provided for actuating flow of hydraulic fluid to the respective pistons 56, 78 to shift the transmission 26 into and out of the noted forward and reverse gears.

Figure 7:
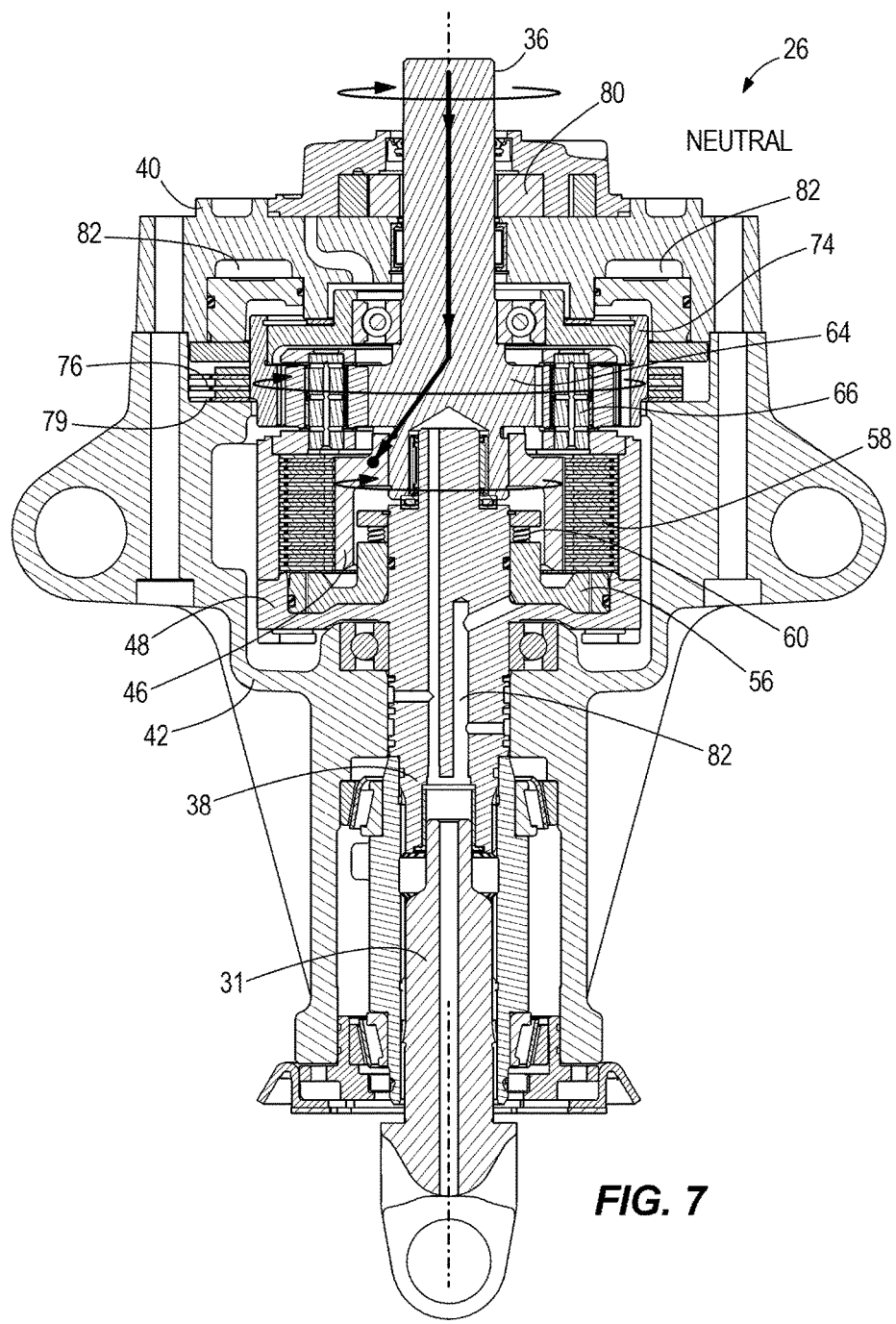
FIG. 7 is a sectional view of the transmission, illustrating power flow in neutral gear.
Figure 8:
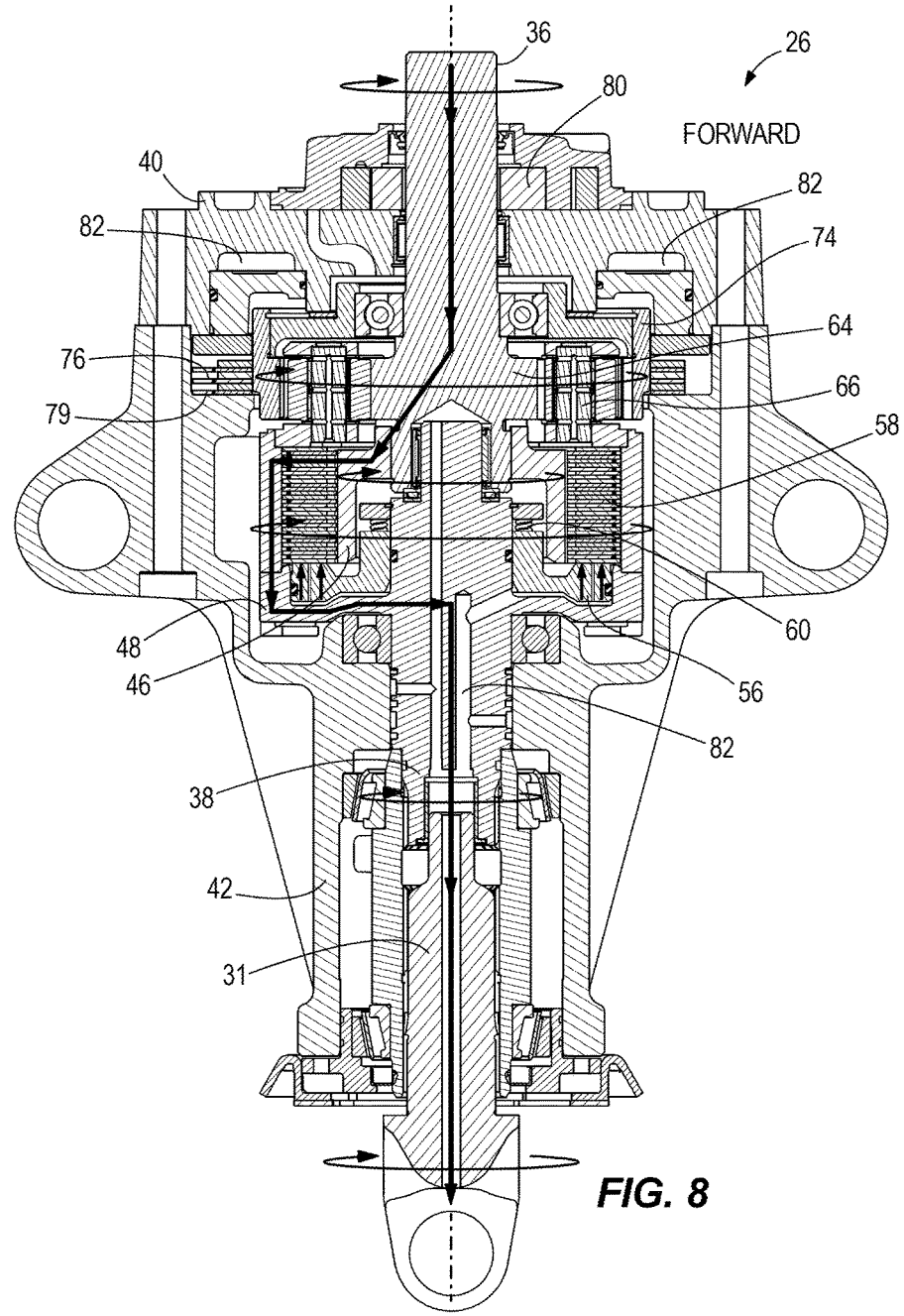
FIG. 8 is a sectional view of the transmission, illustrating power flow in forward gear.
Figure 9:
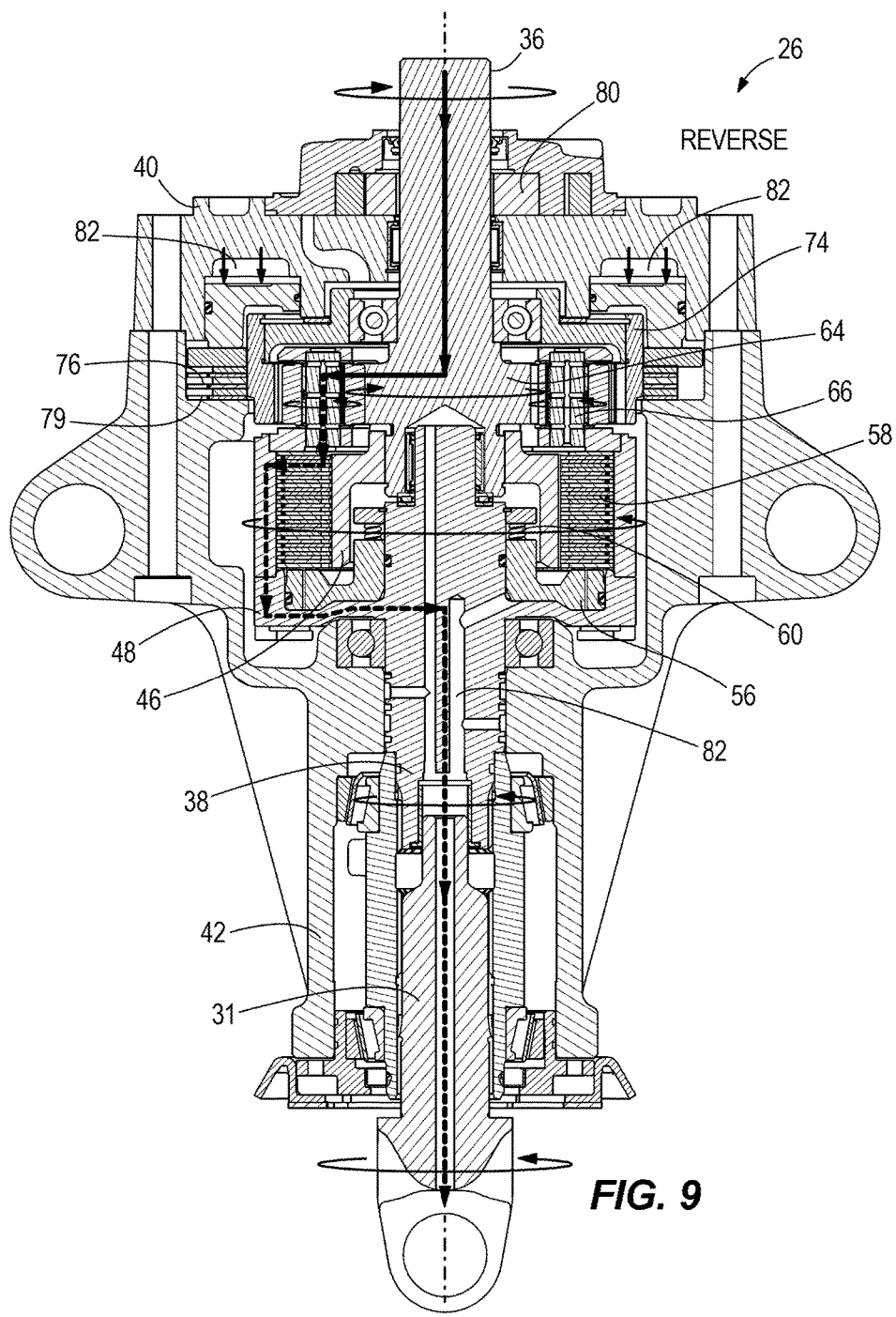
FIG. 9 is a sectional view of the transmission, illustrating power flow in reverse gear.

For ease of understanding, FIGS. 7-9 depict typical power flow through the transmission 26 in neutral, forward gear and reverse gear.

Referring to FIG. 7, when the transmission 26 is shifted into neutral, the pump 80 does not pump enough hydraulic fluid to the forward clutch piston 56 or to the reverse clutch piston 78 to actuate either one. Thus, forward rotation of the input shaft 36 causes forward rotation of the sun gear 64, which causes reverse rotation of the first planet gears 68 and forward rotation of the second planet gears 70. Forward rotation of the second planet gears 70 causes the ring gear 74 to reversely rotate about the input shaft 36. Forward rotation of the ring gear 74 is not transferred to the carrier 54 because the reverse clutch is disengaged. Forward rotation of the input shaft 36 also causes forward rotation of the inner clutch hub 46; however this rotation is not transferred to the carrier 54 because the forward clutch is not engaged. As such, the input shaft 36 and output shaft 38 are operatively disconnected.

Referring to FIG. 8, when the transmission 26 is shifted into forward gear, forward rotation of the input shaft 36 causes forward rotation of the sun gear 64, which causes reverse rotation of the first planet gears 68 and forward rotation of the second planet gears 70. Forward rotation of the second planet gears 70 causes the ring gear 74 to reversely rotate about the input shaft 36; however forward rotation of the ring gear 74 is not transferred to the carrier 54 because the reverse clutch is disengaged. Forward rotation of the input shaft 36 causes forward rotation of the inner clutch hub 46, which causes forward rotation of the carrier 54 due to engagement of the forward clutch, as described herein above. Forward rotation of the carrier 54 causes forward rotation of the lower tray 48 and thus the output shaft 38.

Referring to FIG. 9, when the transmission 26 is shifted into reverse gear, forward rotation of the input shaft 36 causes forward rotation of the sun gear 64, which causes reverse rotation of the first planet gear 68 and forward rotation of the second planet gears 70. The reverse clutch is engaged, thus preventing rotation of the ring gear 74. Thus the plurality of pairs of planet gears 66 and the associated carrier 54 are caused to reversely rotate about the sun gear 64 and input shaft 36. Reverse rotation of the carrier 54 about the input shaft causes corresponding rotation of the output shaft 38 via connection between the carrier 54 and the lower tray 48 on the output shaft 38. Forward rotation of the input shaft 36 causes forward rotation of the inner clutch hub 46; however this rotation is not transferred to the carrier 54 because the forward clutch is not engaged.

The present disclosure thus provides a transmission for a marine drive, which has an input shaft that is caused to rotate by the marine drive and an output shaft that is caused to rotate by the input shaft. The transmission can have any orientation with respect to the marine drive, including generally horizontal or generally vertical. The input shaft and output shaft are operatively connected to each other such that forward rotation of the input shaft causes forward rotation of the output shaft when the transmission is shifted into a forward gear, and such that forward rotation of the input shaft causes reverse rotation of the output shaft when the transmission is shifted into a reverse gear. A planetary gearset operatively couples the input shaft to the output shaft only when the transmission is shifted into the reverse gear. That is, forward rotation of the input shaft causes forward rotation of the output shaft without assistance from the planetary gearset when the transmission is shifted into the forward gear. The planetary gearset comprises a sun gear that rotates with the input shaft, a plurality of planet gears that mesh with the sun gear so that rotation of the sun gear causes corresponding rotation of the plurality of planet gears, and a ring gear on the plurality of planet gears.

When the transmission is shifted into the forward gear, rotary power from forward rotation of the input shaft is transferred to the output shaft without said rotary power traveling though the plurality of planet gears. A carrier is provided for the plurality of planet gears, wherein the carrier rotates with the output shaft.

A forward clutch operatively couples the input shaft to the output shaft when the transmission is shifted into the forward gear. The forward clutch operatively couples the input shaft to the output shaft via the carrier when the transmission is shifted into the forward gear, such that the input shaft causes rotation of the carrier, which causes rotation of the output shaft. An inner clutch hub is provided that rotates with the input shaft, wherein the forward clutch operatively couples the inner clutch hub to the carrier when the transmission is shifted into the forward gear. The forward clutch is hydraulically actuated and comprises a plurality of forward clutch plates on the inner clutch hub and a forward clutch piston that is hydraulically engaged with the forward clutch plates to operatively couple the inner clutch hub to the carrier when the transmission is shifted into the forward gear. The forward clutch piston is hydraulically actuated into engagement with the forward clutch plates against a bias of a plurality of springs.

In the reverse gear, a reverse clutch operatively couples the input shaft to the output shaft via the planetary gearset and the carrier. The reverse clutch prevents rotation of the ring gear, so that rotation of the input shaft causes rotation of the sun gear, which thereby causes the plurality of planet gears to orbit the sun gear, and wherein rotation of the plurality of planet gears causes reverse rotation of the carrier, thereby causing reverse rotation of the output shaft. The plurality of planet gears comprises a plurality of pairs of planet gears, each pair being configured to reverse power flow from the sun gear to the carrier. The reverse clutch comprises a plurality of reverse clutch plates on the ring gear and a reverse clutch piston that is hydraulically engaged with reverse clutch plates to prevent rotation of the ring gear.

A pump is configured to pump hydraulic fluid to power the forward and reverse clutches. Forward rotation of the input shaft powers the pump. The pump and/or flow of hydraulic fluid through the transmission can be controlled/actuated by conventional means, including valves, electronic controls therefore, etc. As shown in the drawings, additional features such as bearings for supporting rotational components, seals, for containing hydraulic fluid and lubrication are also provided. The housing can be made of metal or other suitable material(s).

Thus, advantageously, the present disclosure provides a transmission arrangement for a marine drive, wherein the planetary components are located before the clutch pack. This configuration, since it locks the input shaft directly to the output shaft, only requires the clutch pack to carry the engine torque, without the above-discussed solar ratio multiplier. This arrangement only carries a load through the planetary in reverse gear, which is a much lower torque than is required in the forward gear. This allows the transmission components to be shorter in length and lighter in weight than the prior art.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transmission for a marine drive, the transmission comprising:
   an input shaft that is caused to rotate by the marine drive;
   an output shaft that is caused to rotate by the input shaft;
   wherein the input shaft and output shaft are operatively connected to each other such that forward rotation of the input shaft causes forward rotation of the output shaft when the transmission is shifted into a forward gear, and such that forward rotation of the input shaft causes reverse rotation of the output shaft when the transmission is shifted into a reverse gear;

a planetary gearset that operatively couples the input shaft to the output shaft only when the transmission is shifted into the reverse gear;

wherein the planetary gearset comprises a sun gear that rotates with the input shaft, a plurality of planet gears that mesh with the sun gear so that rotation of the sun gear causes corresponding rotation of the plurality of planet gears, and a ring gear on the plurality of planet gears;

a carrier for the plurality of planet gears, wherein the carrier rotates with the output shaft; and a reverse clutch, wherein in the reverse gear, the reverse clutch operatively couples the input shaft to the output shaft via the planetary gearset and the carrier.

2. The transmission according to claim 1, wherein forward rotation of the input shaft causes forward rotation of the output shaft without assistance from the planetary gearset when the transmission is shifted into the forward gear.

3. The transmission according to claim 1, wherein when the transmission is shifted into the forward gear, rotary power from forward rotation of the input shaft is transferred to the output shaft without said rotary power traveling though the plurality of planet gears.

4. The transmission according to claim 1, further comprising a forward clutch that operatively couples the input shaft to the output shaft when the transmission is shifted into the forward gear.

5. The transmission according to claim 4, wherein the forward clutch operatively couples the input shaft to the output shaft via the carrier when the transmission is shifted into the forward gear, such that the input shaft causes rotation of the carrier, which causes rotation of the output shaft.

6. The transmission according to claim 5, further comprising an inner clutch hub that rotates with the input shaft, wherein the forward clutch operatively couples the inner clutch hub to the carrier when the transmission is shifted into the forward gear.

7. The transmission according to claim 6, wherein the forward clutch is hydraulically actuated.

8. The transmission according to claim 7, wherein the forward clutch comprises a plurality of forward clutch plates on the inner clutch hub and a forward clutch piston that is hydraulically engaged with the forward clutch plates to operatively couple the inner clutch hub to the carrier when the transmission is shifted into the forward gear.

9. The transmission according to claim 8, further comprising a spring, wherein the forward clutch piston is hydraulically actuated into engagement with the forward clutch plates against a bias of the spring.

10. The transmission according to claim 1, wherein the reverse clutch prevents rotation of the ring gear, so that rotation of the input shaft causes rotation of the sun gear, which thereby causes the plurality of planet gears to orbit the sun gear, and wherein rotation of the plurality of planet gears causes reverse rotation of the carrier, thereby causing reverse rotation of the output shaft.

11. The transmission according to claim 10, wherein the plurality of planet gears comprises a plurality of pairs of planet gears, each pair being configured to reverse power flow from the sun gear to the carrier.

12. The transmission according to claim 10, wherein the reverse clutch comprises a plurality of reverse clutch plates on the ring gear and a reverse clutch piston that is hydraulically engaged with reverse clutch plates to prevent rotation of the ring gear.

13. The transmission according to claim 12, further comprising a pump that pumps hydraulic fluid to power the forward and reverse clutches.

14. The transmission according to claim 13, wherein forward rotation of the input shaft powers the pump.

15. The transmission according to claim 1, wherein the input shaft and the output shaft are coaxial.

16. The transmission according to claim 1, wherein the input shaft and output shaft are operatively disconnected when the transmission is shifted into neutral.

17. A marine propulsion device comprising:

a marine drive that causes a driveshaft to forwardly rotate;

a transmission for the marine drive, the transmission comprising:

an input shaft that is caused to rotate by the marine drive;

an output shaft that is caused to rotate by the input shaft;

wherein the input shaft and output shaft are operatively connected to each other such that forward rotation of the input shaft causes forward rotation of the output shaft when the transmission is shifted into a forward gear, and such that forward rotation of the input shaft causes reverse rotation of the output shaft when the transmission is shifted into a reverse gear; and a planetary gearset that operatively couples the input shaft to the output shaft only when the transmission is shifted into the reverse gear; and a propulsor that is caused to provide a forward or reverse thrust based upon whether the transmission is in forward or reverse gear;

wherein the planetary gearset comprises a sun gear that rotates with the input shaft, a plurality of planet gears that mesh with the sun gear so that rotation of the sun gear causes corresponding rotation of the plurality of planet gears, and a ring gear on the plurality of planet gears;

a carrier for the plurality of planet gears, wherein the carrier rotates with the output shaft; and a reverse clutch, wherein in the reverse gear, the reverse clutch operatively couples the input shaft to the output shaft via the planetary gearset and the carrier.

* * * * *